US012664494B2

(12) United States Patent
Gosain et al.

(10) Patent No.: US 12,664,494 B2
(45) Date of Patent: Jun. 23, 2026

(54) DECISION MANAGEMENT FOR ITEMS DIGITALLY REPRESENTED IN AN INFORMATION PROCESSING SYSTEM

(71) Applicant: Dell Products L.P., Round Rock, TX (US)

(72) Inventors: Rohit Gosain, Bangalore (IN); Bhanu Murthy Modali, Hyderabad (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 18/478,437

(22) Filed: Sep. 29, 2023

(65) Prior Publication Data

US 2025/0111310 A1 Apr. 3, 2025

(51) Int. Cl.
| | |
|---|---|
| *G06Q 10/06* | (2023.01) |
| *G06F 18/23211* | (2023.01) |
| *G06F 18/2415* | (2023.01) |
| *G06Q 10/0631* | (2023.01) |

(52) U.S. Cl.
CPC . *G06Q 10/06315* (2013.01); *G06F 18/23211* (2023.01); *G06F 18/2415* (2023.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 5,953,707 A | 9/1999 | Huang et al. | |
| 6,963,849 B1 | 11/2005 | Chaturvedi et al. | |

| | | | |
|---|---|---|---|
| 7,035,704 B2 | 4/2006 | Lee et al. | |
| 7,668,761 B2 | 2/2010 | Jenkins et al. | |
| 7,831,463 B2 | 11/2010 | Nagar | |
| 8,311,906 B1 | 11/2012 | Campbell et al. | |
| 8,626,544 B2 | 1/2014 | An et al. | |

(Continued)

FOREIGN PATENT DOCUMENTS

WO 2021197351 A1 10/2021

OTHER PUBLICATIONS

A. Federgruen et al., "Selecting a Portfolio of Suppliers Under Demand and Supply Risks," Operations Research, vol. 56, No. 4, Jul.-Aug. 2008, pp. 916-936.

(Continued)

*Primary Examiner* — Arif Ullah
(74) *Attorney, Agent, or Firm* — Ryan, Mason & Lewis, LLP

(57) ABSTRACT

A decision management technique comprises obtaining, for a set of items, data indicative of a previous percentage division between a first item type and a second item type for each item in the set of items. The technique further comprises classifying each item in the set of items into one of a plurality of clusters, based on the obtained data, wherein each cluster represents a different percentage division range between the first item type and the second item type. The technique further comprises identifying any items in each cluster that deviate from the percentage division range for the cluster, and then applying weights to any identified items based on the deviation from the percentage division range. The technique further comprises re-classifying any identified items to another cluster in the plurality of clusters based on the applied weights.

20 Claims, 7 Drawing Sheets

100

(56) References Cited

U.S. PATENT DOCUMENTS

| | | | | |
|---|---|---|---|---|
| 9,779,364 | B1 * | 10/2017 | Hoover | G06Q 30/0206 |
| 10,878,354 | B1 | 12/2020 | Zbikowski et al. | |
| 10,902,419 | B2 | 1/2021 | Soni et al. | |
| 10,970,669 | B2 | 4/2021 | Yund et al. | |
| 11,037,211 | B2 | 6/2021 | Preston et al. | |
| 11,055,658 | B2 | 7/2021 | Jacobson et al. | |
| 11,164,267 | B2 | 11/2021 | Singh et al. | |
| 11,341,457 | B2 | 5/2022 | Paulson et al. | |
| 11,410,105 | B2 | 8/2022 | Gill et al. | |
| 11,416,809 | B1 | 8/2022 | Shekhar et al. | |
| 11,823,114 | B1 * | 11/2023 | Robberson | G06Q 10/0833 |
| 2002/0019761 | A1 | 2/2002 | Lidow | |
| 2002/0178049 | A1 | 11/2002 | Bye | |
| 2005/0096958 | A1 | 5/2005 | Rice et al. | |
| 2005/0177435 | A1 | 8/2005 | Lidow | |
| 2006/0004473 | A1 | 1/2006 | Lee | |
| 2006/0247939 | A1 | 11/2006 | An et al. | |
| 2007/0100675 | A1 | 5/2007 | Kneisel et al. | |
| 2007/0239652 | A1 * | 10/2007 | Tuv | G06N 20/00 |
| | | | | 706/62 |
| 2008/0208659 | A1 | 8/2008 | An et al. | |
| 2012/0123816 | A1 | 5/2012 | Zhang et al. | |
| 2014/0337086 | A1 | 11/2014 | Asenjo et al. | |
| 2016/0048852 | A1 | 2/2016 | Beh et al. | |
| 2016/0275425 | A1 | 9/2016 | Ni et al. | |
| 2017/0098186 | A1 | 4/2017 | Song et al. | |
| 2018/0365605 | A1 * | 12/2018 | Kurokawa | G06Q 10/067 |
| 2019/0347606 | A1 | 11/2019 | Malecha et al. | |
| 2020/0111109 | A1 | 4/2020 | Lei et al. | |
| 2020/0210947 | A1 | 7/2020 | Devarakonda et al. | |
| 2020/0226536 | A1 | 7/2020 | Uttam et al. | |
| 2021/0081840 | A1 | 3/2021 | Darmour et al. | |
| 2021/0110461 | A1 | 4/2021 | Wang et al. | |
| 2022/0343278 | A1 | 10/2022 | Panikkar et al. | |
| 2023/0012566 | A1 | 1/2023 | Panikkar et al. | |
| 2023/0062764 | A1 * | 3/2023 | Salman | G06Q 10/087 |
| 2023/0114142 | A1 | 4/2023 | Panikkar et al. | |
| 2023/0115896 | A1 | 4/2023 | Panikkar et al. | |
| 2023/0230002 | A1 | 7/2023 | Panikkar et al. | |
| 2023/0297946 | A1 | 9/2023 | Panikkar et al. | |
| 2024/0095673 | A1 * | 3/2024 | Loi | G06Q 10/087 |

OTHER PUBLICATIONS

B. Stecanella, "An Introduction to Support Vector Machines (SVM)" https://monkeylearn.com/blog/introduction-to-support-vector-machines-svm/#:~:text=A%20support%20vector%20machine%20(SVM,able%20to%20categorize%20new%20text, Jun. 22, 2017, 20 pages.
Wikipedia, "Support-vector Machine," https://en.wikipedia.org/wiki/Support-vector_machine, Apr. 18, 2021, 20 pages.
Wikipedia, "Linear Regression," https://en.wikipedia.org/wiki/Linear_regression, Apr. 15, 2021, 17 pages.
Bayes Server, "Prediction with Bayesian Networks," https://www.bayesserver.com/docs/techniques/prediction#:~:text=Joint%20prediction,are%20in%20the%20same%20model, Accessed Apr. 19, 2021, 10 pages.
Wikipedia, "Machine Learning," https://en.wikipedia.org/wiki/Machine_learning, Jul. 5, 2021, 26 pages.
Wikipedia, "Blockchain," https://en.wikipedia.org/wiki/Blockchain, Jul. 4, 2021, 28 pages.
Wikipedia, "Supply Chain Management," https://en.wikipedia.org/w/index.php?title=Supply_chain_management&oldid=1083282625, Apr. 18, 2022, 14 pages.
U.S. Appl. No. 17/726,758 filed in the name of Ajay Maikhuri et al. on Apr. 22, 2022, and entitled "Intelligent Prediction for Equipment Manufacturing Management System."
U.S. Appl. No. 17/828,347 filed in the name of Ajay Maikhuri et al. on May 31, 2022, and entitled "Intelligent Balancing of Items Managed in an Information Processing System."
U.S. Appl. No. 17/970,896 filed in the name of Rohit Gosain et al. on Oct. 21, 2022, and entitled "Intelligent Management of Inventory Items in an Information Processing System."
U.S. Appl. No. 17/983,042 filed in the name of Ajay Maikhuri et al. on Nov. 8, 2022, and entitled "Intelligent Item Management in an Information Processing System."

* cited by examiner

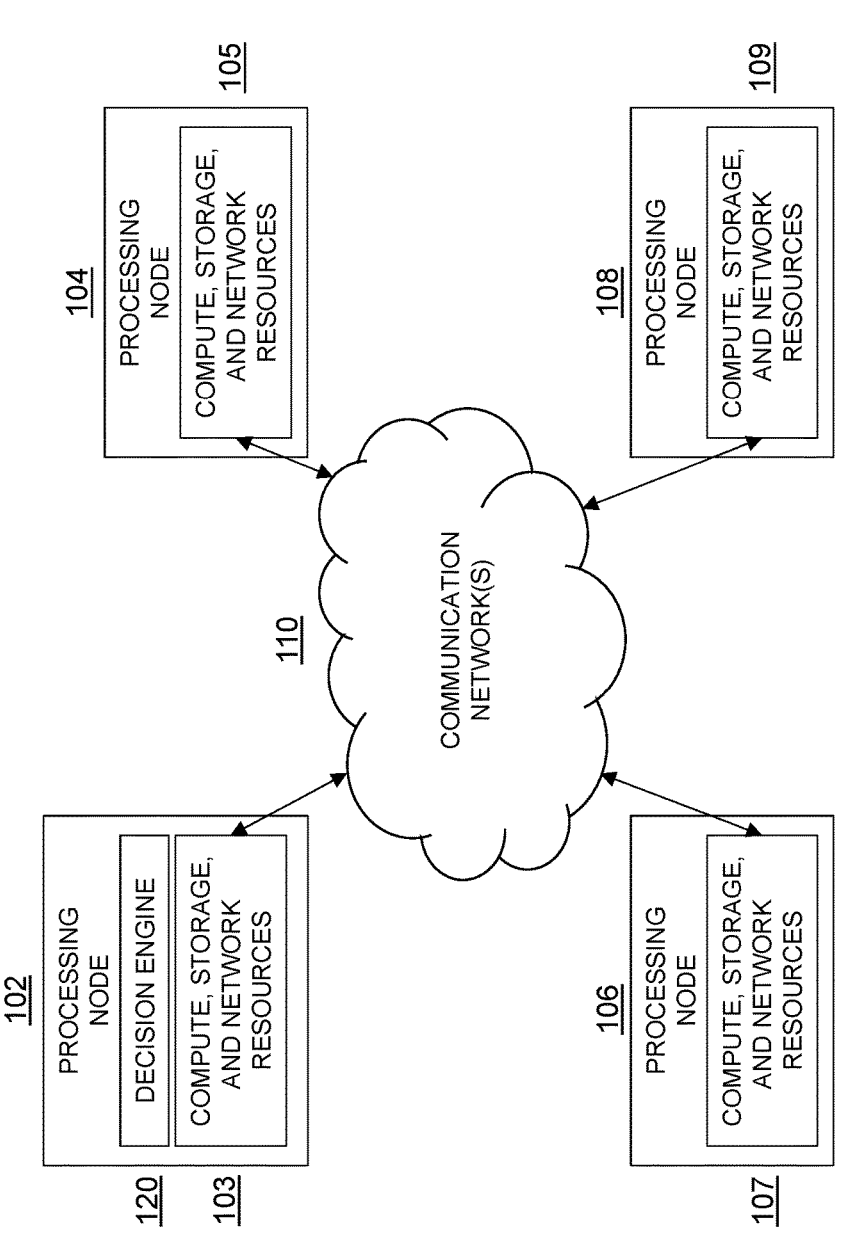
FIG. 1

400

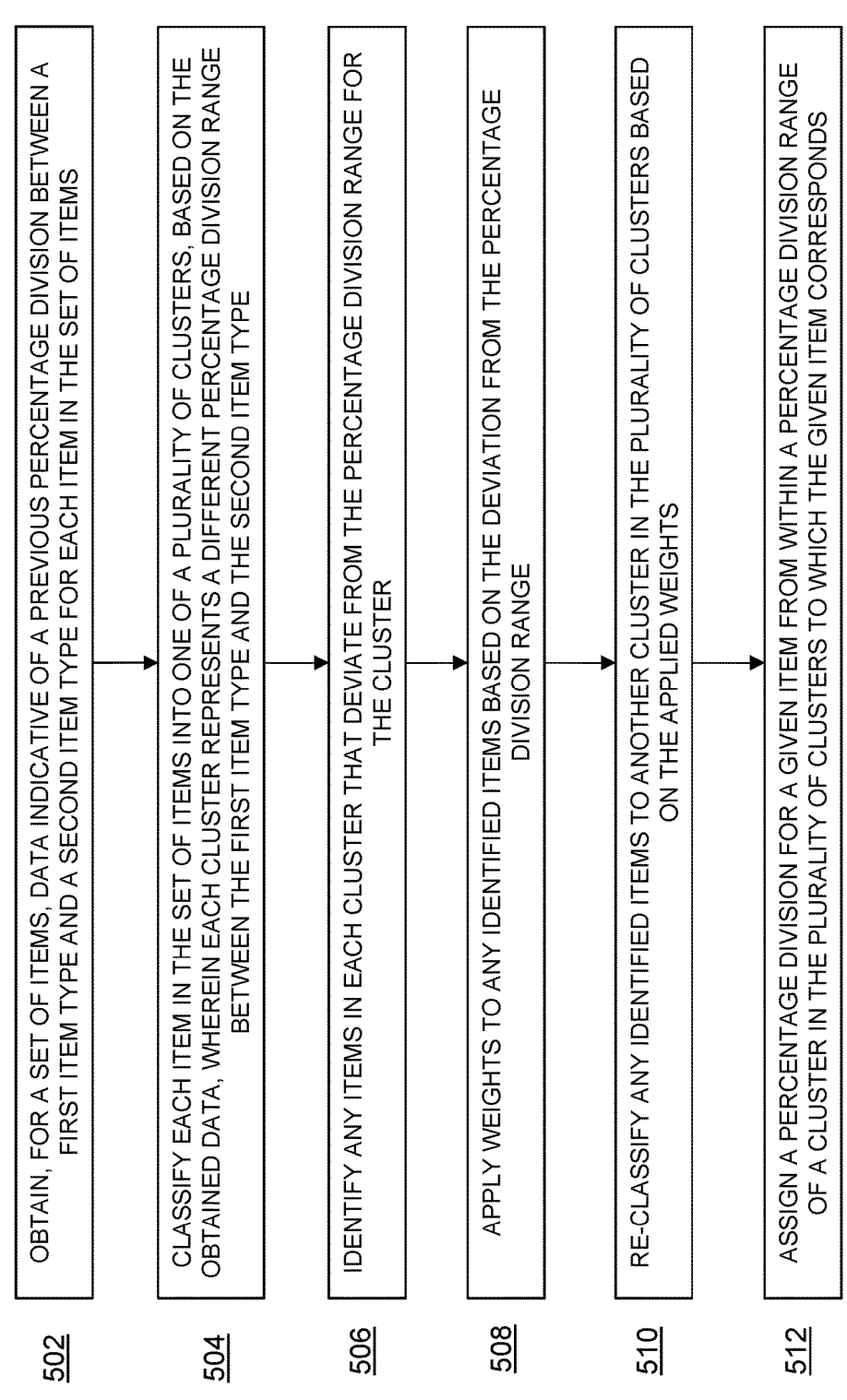

502    OBTAIN, FOR A SET OF ITEMS, DATA INDICATIVE OF A PREVIOUS PERCENTAGE DIVISION BETWEEN A FIRST ITEM TYPE AND A SECOND ITEM TYPE FOR EACH ITEM IN THE SET OF ITEMS

504    CLASSIFY EACH ITEM IN THE SET OF ITEMS INTO ONE OF A PLURALITY OF CLUSTERS, BASED ON THE OBTAINED DATA, WHEREIN EACH CLUSTER REPRESENTS A DIFFERENT PERCENTAGE DIVISION RANGE BETWEEN THE FIRST ITEM TYPE AND THE SECOND ITEM TYPE

506    IDENTIFY ANY ITEMS IN EACH CLUSTER THAT DEVIATE FROM THE PERCENTAGE DIVISION RANGE FOR THE CLUSTER

508    APPLY WEIGHTS TO ANY IDENTIFIED ITEMS BASED ON THE DEVIATION FROM THE PERCENTAGE DIVISION RANGE

510    RE-CLASSIFY ANY IDENTIFIED ITEMS TO ANOTHER CLUSTER IN THE PLURALITY OF CLUSTERS BASED ON THE APPLIED WEIGHTS

512    ASSIGN A PERCENTAGE DIVISION FOR A GIVEN ITEM FROM WITHIN A PERCENTAGE DIVISION RANGE OF A CLUSTER IN THE PLURALITY OF CLUSTERS TO WHICH THE GIVEN ITEM CORRESPONDS

600

DECISION MANAGEMENT FOR ITEMS DIGITALLY REPRESENTED IN AN INFORMATION PROCESSING SYSTEM

FIELD

The field relates generally to information processing systems, and more particularly to techniques for decision management for items digitally represented in such information processing systems.

BACKGROUND

Implementation of supply chain management techniques in information processing systems such as, for example, distributed computer networks has found wide-ranging applications. In one non-limiting application, supply chain management in an original equipment manufacturer (OEM) use case may involve scenarios wherein the OEM procures parts (raw materials) from vendors and/or suppliers to manufacture equipment (end products) ordered by its customers. While the OEM may have its own manufacturing facilities, in some cases, the OEM may partner with an original design manufacturer (ODM) and/or a contract manufacturer (CM) at whose facilities the equipment is actually manufactured, e.g., the components are assembled into an end product. In the course of procuring raw material, a forecasted supply (amount of raw materials predicted to be needed) may typically be held at a small load carrier (SLC) or warehouse from which the manufacturing facility (factory) will source inventory (parts) for manufacturing. The forecasting, procuring, delivering, sourcing, and/or other managing operations of these parts in accordance with a supply chain management system may be done via an underlying distributed computer network wherein the parts and other related items in the supply chain management system are digitally represented as data in the underlying distributed computer network.

Oftentimes, the underlying distributed computer network(s) implementing the supply chain management techniques in an OEM use case involves one or more processing nodes at each entity (e.g., OEM site, vendor site, ODM/CM site, SLC site, etc.) that are limited in terms of compute, storage and/or network resources. Furthermore, oftentimes, the processing nodes are connected over one or more communication networks that may have limited communication bandwidth. Such technical limitations with respect to the resources of the underlying distributed computer network cause, for example, computer processing delays, data storage shortages, and/or communication network congestion, especially when events in the supply chain management system cause additional resources to be needed.

SUMMARY

Illustrative embodiments provide techniques for decision management of items digitally represented in information processing systems.

For example, in one or more illustrative embodiments, a method comprises obtaining, for a set of items, data indicative of a previous percentage division between a first item type and a second item type for each item in the set of items. The method further comprises classifying each item in the set of items into one of a plurality of clusters, based on the obtained data, wherein each cluster represents a different percentage division range between the first item type and the second item type. The method further comprises identifying any items in each cluster that deviate from the percentage division range for the cluster. The method further comprises applying weights to any identified items based on the deviation from the percentage division range. The method further comprises re-classifying any identified items to another cluster in the plurality of clusters based on the applied weights.

Advantageously, illustrative embodiments provide decision management functionalities for, inter alia, intelligently predicting an accurate percentage split between two types of a given item based on previous percentage splits and consequences of the previous percentage splits. Such improved prediction in accordance with decision management functionalities relieves the burden on compute, storage and/or network resources of an underlying distributed computer network used to provide such functionalities. While advantageously applicable to supply chain management, it is to be appreciated that computer network improvement techniques described herein are not limited to such a particular application. These and other illustrative embodiments include, without limitation, methods, apparatus, networks, systems and processor-readable storage media.

BRIEF DESCRIPTION OF THE DRAWINGS

FIG. 1 illustrates an information processing system configured with a decision engine for providing management functionalities for digital representations of items according to an illustrative embodiment.

FIG. 5 illustrates a decision management methodology according to an illustrative embodiment.

DETAILED DESCRIPTION

Figure 2:
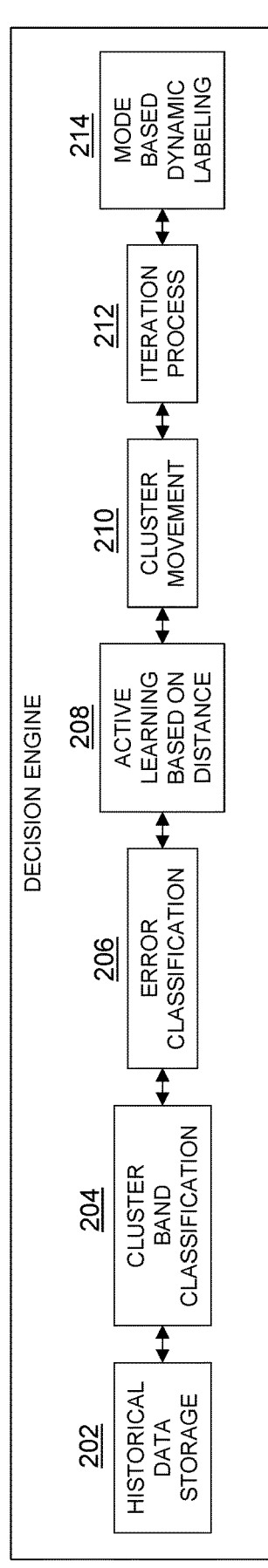
FIG. 2 illustrates a decision engine architecture according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, processing systems comprising compute, storage and/or network resources, other types of processing systems comprising various combinations of physical and/or virtual resources, as well as other types of distributed computer networks.

As mentioned, technical limitations of resources of underlying computer networks used to implement supply chain management techniques cause, for example, computer processing delays, data storage shortages, and/or communication network congestion, especially when events in the resulting supply chain management system cause additional compute, storage and/or network resources to be needed.

By way of one example, assume that the portion of the forecasted supply that the OEM procures is referred to as OEM-owned inventory (OOI) and the remainder of the forecasted supply is referred to as vendor-owned inventory (VOI).

While the OEM does not purchase up-front the VOI, typically the underlying distributed computer network associated with the OEM's inventory management system tracks the VOI for potential procurement for upcoming customer orders. This OOI/VOI arrangement is advantageous for the OEM because there can be scenarios where certain forecasted parts become obsolete (e.g., 2 GB RAM chip) or upgraded (e.g., a new Intel chip) over the duration of the manufacturing process. As such, purchasing parts that turn out to be obsolete places a processing burden (i.e., return operations, exchange operations, etc.) on the processing node part of the underlying distributed computer system associated with the OEM's inventory management system, e.g., return processing overhead, reorder processing overhead, exchange processing overhead, etc. Such burden also includes a requirement for additional storage since reorders and exchanges create additional data to be generated and stored on storage resources of the underlying distributed computer network. Likewise, network congestion on a limited-bandwidth communication network increases since the network resources of the various processing nodes need to communicate with one another to affect the reorders and exchanges.

However, even though VOI is marked for a first OEM in an OOI/VOI arrangement, a CM can decide to use the VOI for a second OEM's manufacturing job. This can lead to a parts shortage when the first OEM then tries to access the VOI, which leads to further compute, storage and/or network resource burdens. To address these situations in an OOI/VOI arrangement, the first OEM can seek a parts stock guarantee from the vendor. In contrast, a rule that favors the vendor in an OOI/VOI arrangement is that if an OEM keeps VOI for more than an agreed upon time period (e.g., 90 days), the VOI will automatically be designated as OOI, and the OEM is then responsible to pay for the VOI.

Thus, deciding on the OOI percentage is a challenge for the OEM, and can have a significant negative affect on the underlying distributed computer network when the percentage is not decided accurately. While a low OOI percentage delays cost and overhead, it also puts the OEM at risk of a part shortage if there is no parts stock guarantee in place for VOI. Parts must therefore be quickly ordered, placing a burden on the compute, storage and/or network resources of the underlying distributed computer network.

In existing approaches, OOI is manually calculated based on historical sales of end products or OEM equipment which is not accurate and results in overstock and/or parts shortages. It is realized herein that a main reason is that historical sales do not give an accurate pattern of part acquisition and/or availability of inflight materials from the supplier or inventory in another factory.

Another complication of deciding on an OOI/VOI split (OOI percentage decision) is the criticality of the part. Some parts are procured and kept as OOI because the OEM never wants to experience a shortage of that critical part, while other parts can withstand a shortage as they can be made available easier. Moreover, there are many other factors that affect the OOI percentage decision including, but not limited to, time to procure, end of life, capacity at the warehouse, and so on depending on the end product. A significant amount of human intelligence is required today to decide the percentage division between OOI and VOI. However, even with significant human effort, the OOI/VOI decision is typically inaccurate resulting in computational and other technical issues described herein.

Illustrative embodiments overcome the above-stated and other technical issues with existing approaches by providing intelligent decision management functionalities. In one or more illustrative embodiments, intelligent decision management functionalities may comprise inventory adjustment methodologies and systems for intelligently managing OOI in accordance with and underlying distributed computer network, i.e., an information processing system. Such methodologies and systems, as will be explained in detail herein, consider historical divisions of OOI/VOI as well as data indicative of problems that occurred against the incoming orders (e.g., order run rate). More particularly, in some embodiments, the division is classified in different classification buckets (clusters) and moving factors are used to identify multiple modes of OOI that can be established over a time period (e.g., 3-6 months) with respect to the different classifications. For example, in some embodiments, the multiple modes can comprise: (i) an aggressive mode (e.g., OOI percentage that avoids parts shortage but can result in overstock); (ii) a normal mode (e.g., OOI percentage that balances between risk of parts shortage and overstock); and (iii) a passive mode (OOI percentage that minimizes overstock but that can result in parts shortage).

Such intelligent OOI management, in accordance with one or more illustrative embodiments, provides optimal OOI prediction of a given part and manufacturing facility based on unique combinations of classification models, active learning based on weighted distance on errors and generalized addictive model (GAM) algorithms and/or random forest models. Such optimal OOI prediction in accordance with decision management functionalities that, in one or more illustrative embodiments, may be implemented in a decision engine configured to digitally represent parts in an inventory as items, relieves the burden on compute, storage and/or network resources of an underlying distributed computer network used to provide supply chain management.

FIG. 1 illustrates an information processing system 100 configured with a decision engine configured with decision management functionalities according to an illustrative embodiment. As shown, information processing system 100 comprises a processing node 102, a processing node 104, a processing node 106, and a processing node 108 operatively coupled to one another via one or more communication networks 110. Processing nodes 102, 104, 106, and 108 comprise sets of underlying compute, storage, and network resources 103, 105, 107, and 109, respectively.

By way of example only, processing nodes 102, 104, 106, and 108 can each be associated with a functional entity in a supply chain management system such as, for example, in OEM use cases described herein. Thus, processing node 102 can be an OEM processing node, processing node 104 can be a vendor processing node, processing node 106 can be an ODM/CM processing node, and processing node 108 can be an SLC processing node.

As such, in accordance with one or more illustrative embodiments, processing node 102 further comprises a decision engine 120. Decision engine 120 is configured with decision management functionalities for, inter alia, intelligently predicting an accurate percentage split between two types of a given item based on previous percentage splits and consequences of the previous percentage splits. In illustrative embodiments further explained herein, the percentage split between two item types comprises an OOI/VOI percentage split to be adopted by an OEM in a supply chain management scenario.

Figure 3:
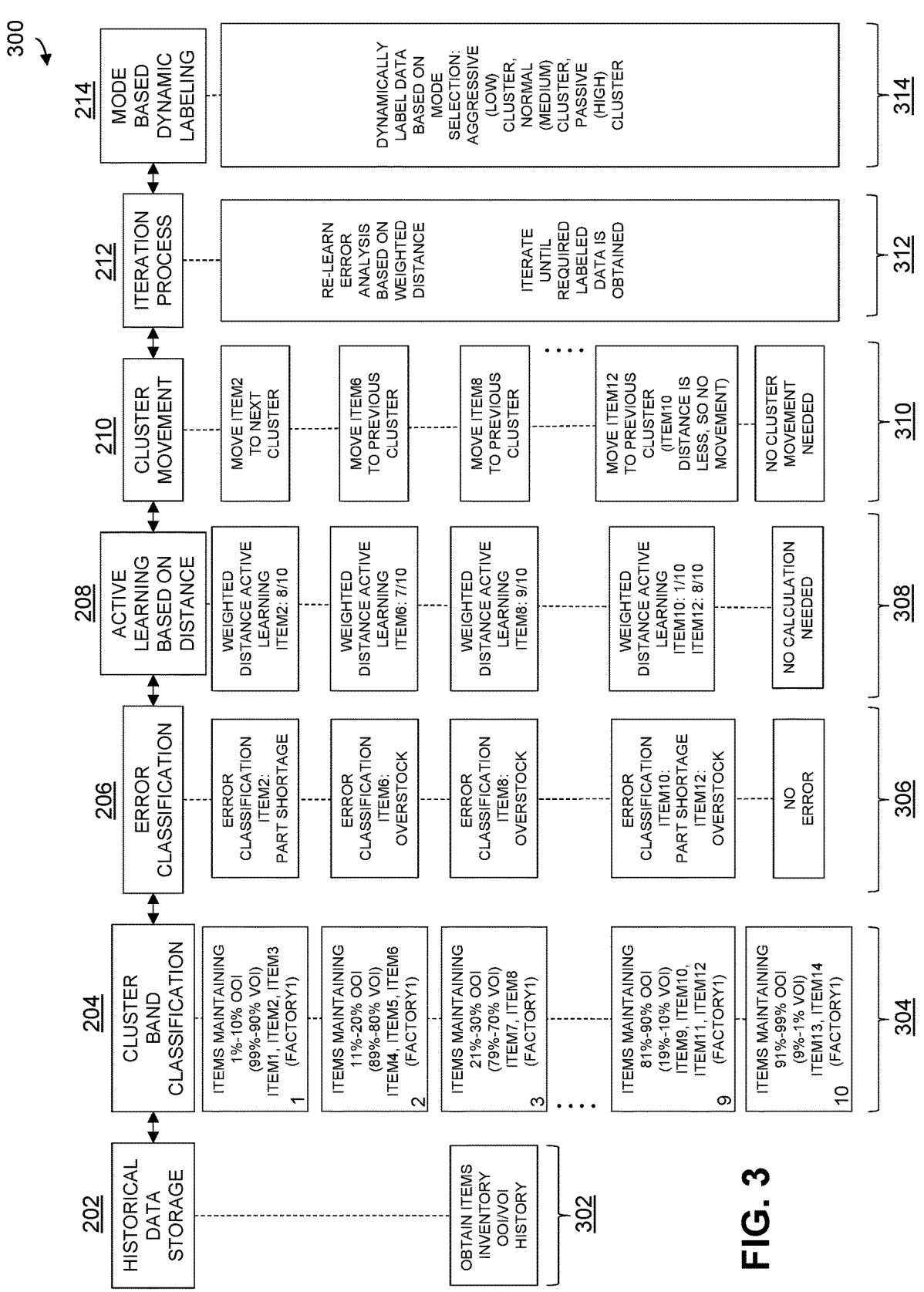
FIG. 3 illustrates an exemplary process flow for the decision engine of FIG. 2.

FIG. 2 illustrates a decision engine architecture 200 which represents decision engine 120 in FIG. 1 according to an illustrative embodiment. As shown, decision engine architecture 200 comprises a plurality of modules including a historical data storage module 202, a cluster band classification module 204, an error classification module 206, a module 208 for active learning based on distance, a cluster movement module 210, an iteration process module 212, and a mode based dynamic labeling module 214. Furthermore, a process flow 300 comprising steps 302 through 314 in FIG. 3 corresponds to decision engine architecture 200. Thus, details of decision engine architecture 200 will be explained below in the context of a non-limiting item inventory example with respect to process flow 300.

Process flow 300, in step 302 in accordance with historical data storage module 202, first obtains items inventory OOI/VOI historical data.

In step 304, using the historical data obtained from historical data storage module 202, cluster band classification module 204 defines different ranges for the OOI/VOI percentage splits that have occurred over a given historical time period, e.g., previous two to three years, for a set of items (parts) at one or more factories (ODM/CM) where the items were used to manufacture equipment on behalf of the OEM. Thus, assume the following classifications are determined by cluster band classification module 204 in step 304:

Cluster 1 contains items maintaining a 1%-10% OOI split status and thus a 99%-90% VOI split status, i.e., item1, item2, and item3 at factory1.

Cluster 2 contains items maintaining a 11%-20% OOI split status and thus an 89%-80% VOI split status, i.e., item4, item5, and item6 at factory1.

Cluster 3 contains items maintaining a 21%-30% OOI split status and thus a 79%-70% VOI split status, i.e., item7 and item8 at factory1.

Cluster 9 contains items maintaining an 81%-90% OOI split status and thus a 19%-10% VOI split status, i.e., item9, item10, item11 and item12 at factory1.

Cluster 10 contains items maintaining a 91%-99% OOI split status and thus a 9%-1% VOI split status, i.e., item13 and item14 at factory1.

Note that clusters 4, 5, 6, 7 and 8 are not expressly shown but can be classified with similarly uniformly-incremented OOI/VOI percentage ranges between the ranges represented by cluster 3 and cluster 9. However, for simplicity of illustration of this non-limiting inventory example, these clusters are not expressly shown in FIG. 3.

In step 306, using the cluster results determined by cluster band classification module 204, error classification module 206 determines errors, e.g., deviations or problems such as part shortage or overstock, that occurred as a consequence of each OOI/VOI percentage split range in the cluster classifications of step 304. Note that data indicating the errors that occurred as a consequence of the previous ranges can be obtained from historical data storage module 202 as part of the item inventory OOI/VOI history. In some embodiments, error classification is implemented via a k-nearest neighbor (KNN) algorithm.

Thus, for example as shown, for cluster 1, item2 experienced a part shortage condition with a 1%-10%/99%-90% OOI/VOI percentage range split during the historical time period. For cluster 2, item6 experienced an overstock condition with a 11%-20%/89%-80% OOI/VOI percentage range split during the historical time period. For cluster 3, item8 experienced an overstock condition with a 21%-30%/79%-70% OOI/VOI percentage range split during the historical time period. For cluster 9, item10 experienced a part shortage condition and item12 experienced an overstock condition with an 81%-90%/19%-10% OOI/VOI percentage range split during the historical time period. For cluster 10, no error (i.e., part shortage or overstock) was experienced for item13 and item 14 with a 91%-99%/9%-1% OOI/VOI percentage range split during the historical time period.

Note that, in this non-limiting inventory example, a part shortage error indicates a need to increase the OOI percentage and an overstock error indicates a need to decrease the OOI percentage. Thus, in step 308, module 208 for active learning based on distance uses distance based classification based on the number of deviations in each cluster (part shortage as −1 and overstock as +1). In some embodiments, the active learning mechanism used by module 208 can comprise a density weighted method wherein each item that deviated from the OOI/VOI percentage range in each cluster is assigned a distance error value depending on how much the item deviated from the OOI/VOI percentage range. By way of example only, assuming a distance error value range of 1-10, where 1 represents the smallest deviation and 10 represents the largest deviation, item2 in cluster 1 is assigned a distance error of 8/10 (meaning 8 out of 10), item6 in cluster 2 is assigned a distance score of 7/10, item8 in cluster 3 is assigned a distance score of 9/10, and in cluster 9, item10 is assigned a distance score of 1/10 and item12 is assigned an 8/10. No calculation is needed in step 308 for cluster 10 since no item deviated from the OOI/VOI split range during the historical time period.

The density weighted method in step 308 results in the errored data (item deviating from its OOI/VOI split range) being moved to the correct cluster (i.e., re-labeled) via cluster movement module 210 in step 310 of process flow 300. Thus, for example, part shortage items will go to a higher cluster (where the OOI percentage range is greater), and overstock items will move to a lower cluster (where the OOI percentage range is lower). By way of example only, assuming the above distance error values, item2 is moved from cluster 1 to cluster 2 meaning that, for OOI/VOI percentage decisions going forward, item2 will no longer have a 1%-10%/99%-90% OOI/VOI percentage range split (cluster 1), but rather will have a 11%-20%/89%-80% OOI/VOI percentage range split (cluster 2). As further shown, item6 is moved from cluster 2 to cluster 1 and item8 is moved from cluster 3 to cluster 2, each item thus adopting the latter cluster's OOI/VOI range split going forward. In cluster 9, item 12 is moved to cluster 8 (not expressly shown) adopting its OOI/VOI range split going forward. With respect to item10, it remains in cluster 9 since its distance error value is 1/10 and while it did deviate during the historical time period, the deviation is deemed by process flow 300, in this non-limiting example, not to warrant cluster movement. For items in cluster 10, no cluster movement is needed since no deviation occurred during the historical time period.

In step 312, the error analysis and relabeling/cluster movement of steps 308 and 310 can be iterated by iteration process module 212 until all errors are addressed.

In step 314, once all items are re-labeled as determined above, mode based dynamic labeling module 214 assigns a mode label to each item, which can also be realized in a data virtualization (not expressly shown in FIG. 3) based on the above-mentioned multiple modes: (i) an aggressive mode (e.g., high OOI percentage that avoids parts shortage but can result in overstock); (ii) a normal mode (e.g., medium OOI percentage that balances between risk of parts shortage and overstock); and (iii) a passive mode (low OOI percentage that minimizes overstock but that can result in parts shortage).

It is further realized herein that because the item data (parts) typically has a nonlinear relationship and depends on several factors such as, but not limited to, seasonality, product type, order run rate, etc., one or more generalized additive models (GAMs) can be used to represent seasonality, product type, order run rate, etc. as dependent factors.

According, at least one implementation of process flow 300 can be summarized with pseudocode as follows:

(1) Collect the historical OOI and VOI split in each factory by each item;

(2) Classify the different items in each different factory into data set clusters based on previous OOI/VOI percentage divisions;

(3) Distinguish errored data in each data set (i.e., which item caused either a part shortage condition or an overstock condition);

(4) Classify the errored data with a distance classification method (e.g., KNN);

(5) Apply a density weighted method for active learning from the errored data;

(6) Move the errored data to an adjacent cluster according to the error condition (part shortage move to next cluster or overstock move to previous cluster);

(7) Re-label and train model;

(8) If still errored data, loop from step 4; and (9) Virtualize the data in three modes after item re-labeling:

(i) Aggressive mode-set OOI for the given item at the higher end of the cluster, e.g., if the computed cluster is 1%-10% OOI and 99%-90% VOI, suggestion is to assign an OOI/VOI percentage split of 10% OOI and 90% VOI.

(ii) Normal mode-set OOI for the given item at a midpoint of the cluster, e.g., if the computed cluster is 1%-10% OOI and 99%-90% VOI, suggestion is to assign an OOI/VOI percentage split of 5% OOI and 95% VOI.

(iii) Passive mode-set OOI for the given item at the lower end of the cluster, e.g., if the computed cluster is 1%-10% OOI and 99%-90% VOI, suggestion is to assign an OOI/VOI percentage split of 1% OOI and 99% VOI.

Figure 4:
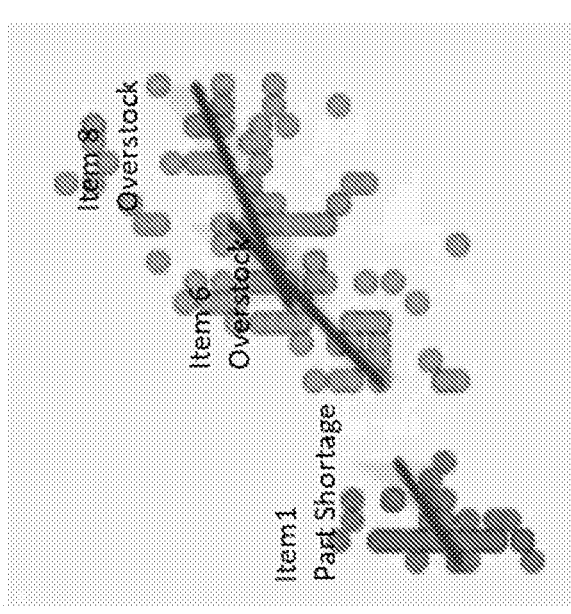
FIG. 4 illustrates a graphical result associated with distance based classification in a decision engine according to an illustrative embodiment.

Thus, advantageously, for the exemplary 14 items in process flow 300 (note that there are likely 1000s of parts in each cluster), for factory1, historical splits are clustered into different clusters (bands). Errors are computed for the clusters in each week of the given historical time period under analysis as a part shortage or an overstock and converted to numerical form to facilitate the modeling process: cluster 1, item2: −1; cluster 2, item6: +1; cluster 3, item9: +1; . . . ; cluster 9, item10: −1 and item12: +1; and cluster 10, no errors. Clusters are based on the number of delays due to a part shortage and the number of overstock occurrences, wherein larger numbers yield more distance, i.e., distance error is classified from 1 to 10. Data virtualization 400 in FIG. 4 illustrates an example for item1 (part shortage), item6 (overstock) and item8 (overstock).

Based on the distance error, the item is moved from one cluster or band to another. In some embodiments, this is configurable based on the criticality of the item, e.g., decision engine architecture 200 can set small distance errors to be corrected, but for non-critical items, it can set long distance errors to be corrected (e.g., weighted configuration is +/−2). It is to be understood that the distance classification is done inside each cluster until the deviations are within the allowed errors defined (weighted configuration).

In some embodiments, an algorithm with GAM regression models can be used for nonlinear relationships to predict the OOI in each cluster and items inside. By way of example, dependent factors in the GAM regression models comprise: (i) seasonality (e.g., in some season, decision engine architecture 200 may have to allocate more OOI); (ii) item criticality (e.g., a highly critical part needs to be reserved as OOI); (iii) end of life of items (e.g., low OOI); (iv) price (e.g., high priced item can be kept as low OOI); and (v) current order run rate (e.g., more OOI as order run rate increases). Further, by way of advantage, since decision engine architecture 200 is using the historical data and labeling it with a unique error distance method, all these variabilities are addressed in the data variation itself. Tuning the regression model based on these variabilities makes the model more accurate. As such, illustrative embodiments provide for optimal OOI prediction of a given part and factory based on unique combinations of classification models, active learning based on weighted distance on errors and a GAM regression model algorithm, with different modes of predictions (e.g., aggressive, normal, passive) of OOI and VOI based on the inventory requirement.

In alternative embodiments, a random forest algorithm or other machine learning algorithm can be used in place of or in addition to a GAM regression model algorithm.

FIG. 5 illustrates a decision management methodology 500 according to an illustrative embodiment. As shown, step 502 obtains, for a set of items (e.g., wherein an item digitally represents an object such as a part), data indicative of a previous percentage division (e.g., OOI/VOI percentage split) between a first item type (e.g., OOI) and a second item type (e.g., VOI) for each item in the set of items. Step 504 classifies each item in the set of items into one of a plurality of clusters (e.g., clusters, bands), based on the obtained data, wherein each cluster represents a different percentage division range (e.g., OOI percentage range/VOI percentage range) between the first item type and the second item type. Step 506 identifies any items in each cluster that deviate (e.g., error due to a part shortage condition or overstock condition) from the percentage division range for the cluster. Step 508 applies weights to any identified items based on the deviation from the percentage division range. Step 510 re-classifies (e.g., re-labels) any identified items to another cluster in the plurality of clusters based on the applied weights. Step 512 assigns a percentage division for a given item (e.g., for subsequent part demand) from within a percentage division range of a cluster in the plurality of clusters (e.g., after re-classification/re-labeling) to which the given item corresponds. It is to be appreciated that the parenthetical examples given above within the descriptions of steps of methodology 500 are not intended to be limiting but rather are given to facilitate illustrative correlation to embodiments described in FIGS. 1-4 above).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for application program management using an application assistant will now be described in greater detail with reference to FIGS. 6 and 7. Although described in the context of information processing system environment mentioned herein, these platforms may also be used to implement at least portions of other information processing systems in other embodiments.

Figure 6:
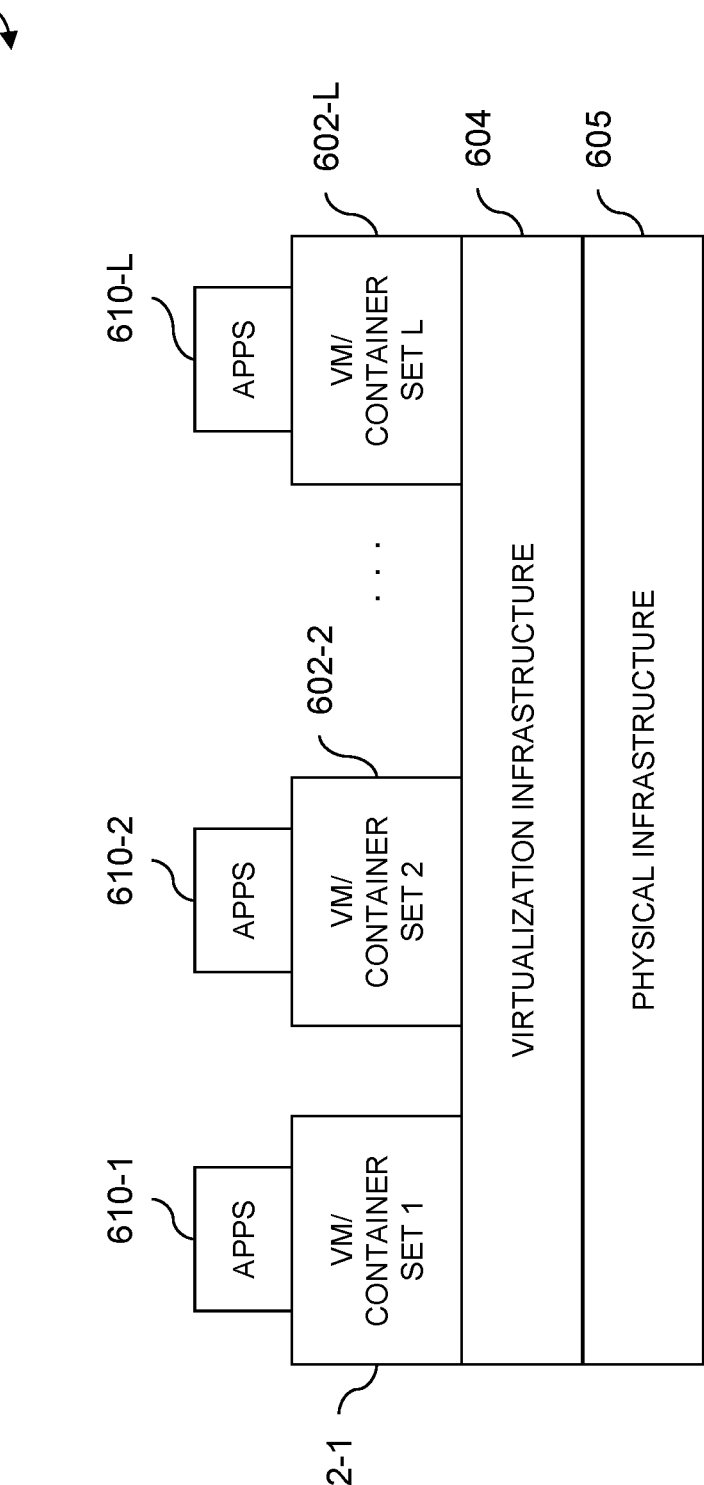
FIGS. 6 and 7 illustrate examples of processing platforms that may be utilized to implement at least a portion of an information processing system in illustrative embodiments.
Figure 7:
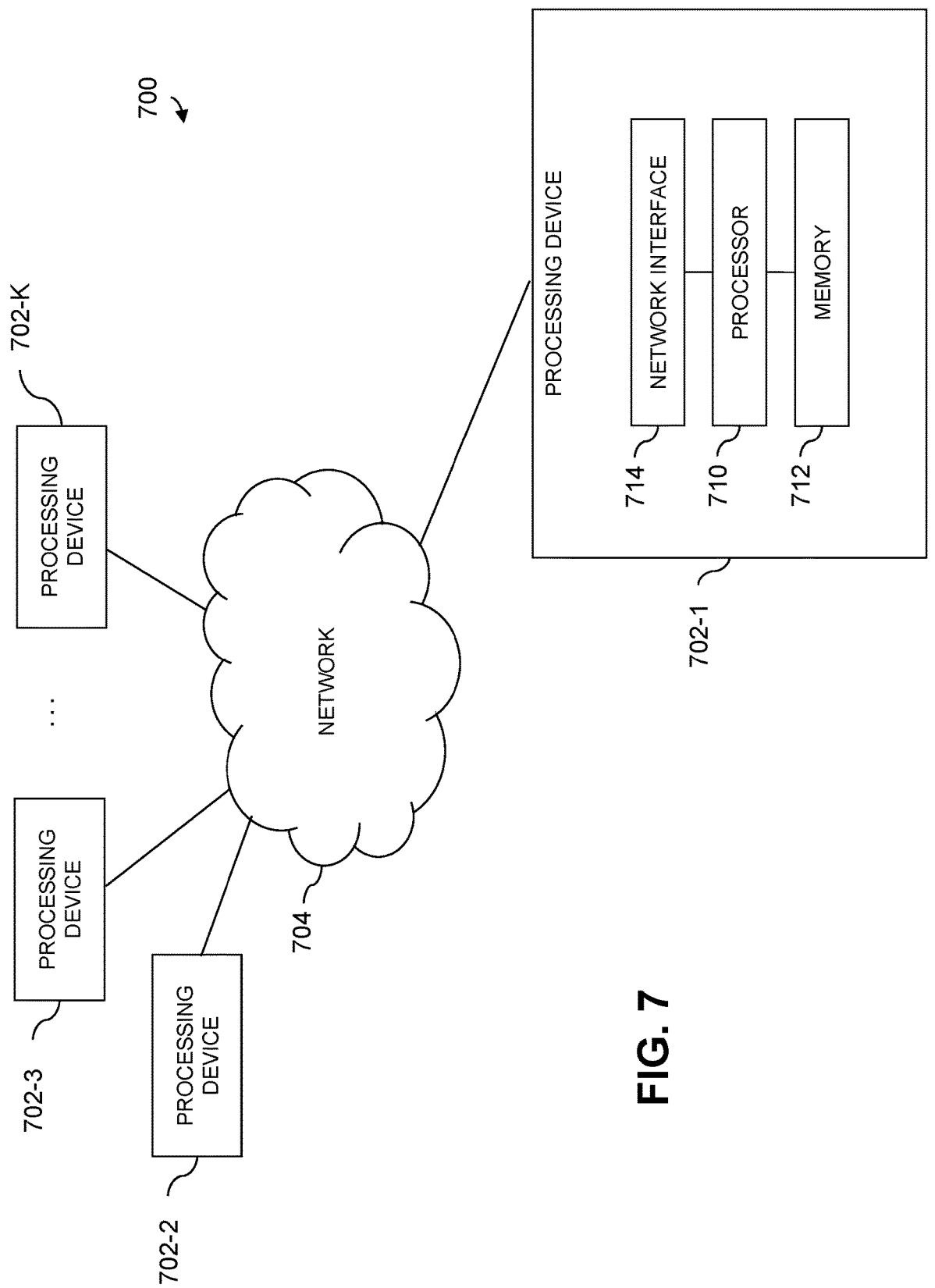

FIG. 6 shows an example processing platform comprising infrastructure 600. Infrastructure 600 comprises a combination of physical and virtual processing resources that may be utilized to implement at least a portion of the information processing system 100 in FIG. 1. Infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

Infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environments mentioned herein may each run on a computer, server, storage device or other processing platform element. A given such element may be viewed as an example of what is more generally referred to herein as a "processing device." Infrastructure 600 shown in FIG. 6 may represent at least a portion of one processing platform. Another example of such a processing platform is processing platform 700 shown in FIG. 7.

The processing platform 700 in this embodiment comprises at least a portion of information processing system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and information processing system environments mentioned herein may include additional or alternative processing platforms, as well as numerous distinct processing platforms in any combination, with each such platform comprising one or more computers, servers, storage devices or other processing devices. For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

implementing a decision engine on a computing platform for executing a process for providing intelligent recommendations for managing an inventory of items by a given entity, wherein the process for providing intelligent recommendations for managing an inventory of items, comprises:

obtaining, for a set of items, data indicative of a previous percentage division between a first item ownership type and a second item ownership type for each item in the set of items, wherein the first item ownership type for a given item corresponds to items that are owned by the given entity, and the second item ownership type for the given item corresponds to items that are owned by another entity and potentially procurable by the given entity;

classifying each item in the set of items into one of a plurality of clusters, based on the obtained data, wherein each cluster represents a different percentage division range between the first item ownership type and the second item ownership type;

executing a first machine learning process that includes identifying any items in each cluster that deviate from the percentage division range for the cluster;

executing a second machine learning process for that includes applying weights to any identified items based on the deviation from the percentage division range;

re-classifying any identified items to another cluster in the plurality of clusters based on the applied weights;

training a third machine learning process based on the re-classified items; executing the trained third machine learning process that includes selecting and assigning a percentage division for a given item from within a percentage division range of a cluster in the plurality of clusters to which the given item corresponds based on one of a set of modes, wherein the set of modes comprises:

a first mode wherein the assigned percentage division is selected from a first portion of the percentage division range;

a second mode wherein the assigned percentage division is selected from a second portion of the percentage division range; and a third mode wherein the assigned percentage division is selected from a third portion of the percentage division range; and virtualizing the selected and assigned percentage division for the given item.

2. The method of claim 1, wherein the first mode comprises an aggressive mode, the second mode comprises a normal mode, and the third mode comprises a passive mode.

3. The method of claim 1, wherein executing the first machine learning process comprises executing an error classification algorithm.

4. The method of claim 3, wherein executing the error classification algorithm comprises executing a k-nearest neighbor algorithm.

5. The method of claim 1, wherein, for the given item, a deviation from the percentage division range for the cluster is based on an occurrence of an error condition defined by a set of error conditions.

6. The method of claim 1, wherein executing the second machine learning process comprises executing a weighted distance algorithm.

7. The method of claim 1, wherein:

the percentage division for the given item comprises a first percentage of a quantity of the given item having the first item ownership type and a second percentage of a quantity of the given item having the second item ownership type; and a percentage division range represents a range for each of the first percentage and the second percentage.

8. The method of claim 7, wherein a deviation from a percentage division range comprises an error condition which indicates that more of the quantity of the given item having the first item ownership type was needed or that less of the quantity of the given item having the first item ownership type was needed.

9. The method of claim 1, wherein;

the given entity is an original equipment manufacturer;

the other entity is a vendor;

the given item represents a part that is used in a manufacturing process such that first item ownership type comprises ownership of a quantity of the part by the original equipment manufacturer that controls manufacturing of equipment using the part; and the second item ownership type comprises ownership of the quantity of the part by the vendor of the part.

10. An apparatus comprising:

at least one computing platform comprising at least one processor device coupled to at least one memory that stores computer program instructions which are executed by the at least one processor device to implement a decision engine that executes on the at least one computing platform to perform a process for providing intelligent recommendations for managing an inventory of items by a given entity, wherein the decision engine operates to:

obtain, for a set of items, data indicative of a previous percentage division between a first item ownership type and a second item ownership type for each item in the set of items, wherein the first item ownership type for a given item corresponds to items that are owned by the given entity, and the second item ownership type for the given item corresponds to items that are owned by another entity and potentially procurable by the given entity;

classify each item in the set of items into one of a plurality of clusters, based on the obtained data, wherein each cluster represents a different percentage division range between the first item ownership type and the second item ownership type;

execute a first machine learning process to identify any items in each cluster that deviate from the percentage division range for the cluster;

execute a second machine learning process to apply weights to any identified items based on the deviation from the percentage division range;

re-classify any identified items to another cluster in the plurality of clusters based on the applied weights train a third machine learning process based on the re-classified items;

execute the trained third machine learning process to select and assign a percentage division for a given item from within a percentage division range of a cluster in the plurality of clusters to which the given item corresponds based on one of a set of modes, wherein the set of modes comprises:

a first mode wherein the assigned percentage division is selected from a first portion of the percentage division range;

a second mode wherein the assigned percentage division is selected from a second portion of the percentage division range; and a third mode wherein the assigned percentage division is selected from a third portion of the percentage division range; and virtualize the selected and assigned percentage division for the given item.

11. The apparatus of claim 10, wherein:

the percentage division for the given item comprises a first percentage of a quantity of the given item having the first item ownership type and a second percentage of a quantity of the given item having the second item ownership type; and a percentage division range represents a range for each of the first percentage and the second percentage.

12. A computer program product comprising a non-transitory processor-readable storage medium having stored therein program code of one or more software programs, wherein the program code when executed by at least one processing device causes the at least one processing device to:

implement a decision engine that executes on a computing platform to perform a process for providing intelligent recommendations for managing an inventory of items by a given entity, wherein the decision engine operates to:

obtain, for a set of items, data indicative of a previous percentage division between a first item ownership type and a second item ownership type for each item in the set of items, wherein the first item ownership type for a given item corresponds to items that are owned by the given entity, and the second item ownership type for the given item corresponds to items that are owned by another entity and potentially procurable by the given entity;

classify each item in the set of items into one of a plurality of clusters, based on the obtained data, wherein each cluster represents a different percentage division range between the first item ownership type and the second item ownership type;

execute a first machine learning process to identify any items in each cluster that deviate from the percentage division range for the cluster;

execute a second machine learning process to apply weights to any identified items based on the deviation from the percentage division range;

re-classify any identified items to another cluster in the plurality of clusters based on the applied weights train a third machine learning process based on the re-classified items;

executing the trained third machine learning process to select and assign a percentage division for a given item from within a percentage division range of a cluster in the plurality of clusters to which the given item corresponds based on one of a set of modes, wherein the set of modes comprises:

a first mode wherein the assigned percentage division is selected from a first portion of the percentage division range;

a second mode wherein the assigned percentage division is selected from a second portion of the percentage division range; and a third mode wherein the assigned percentage division is selected from a third portion of the percentage division range; and virtualize the selected and assigned percentage division for the given item.

13. The apparatus of claim 10, wherein the first mode comprises an aggressive mode, the second mode comprises a normal mode, and the third mode comprises a passive mode.

14. The apparatus of claim 10, wherein the first machine learning process comprises an error classification algorithm.

15. The apparatus of claim 14, wherein the error classification algorithm comprises a k-nearest neighbor algorithm.

16. The apparatus of claim 10, wherein, for the given item, a deviation from the percentage division range for the cluster is based on an occurrence of an error condition defined by a set of error conditions.

17. The apparatus of claim 10, wherein the second machine learning process comprises a weighted distance algorithm.

18. The apparatus of claim 11, wherein a deviation from a percentage division range comprises an error condition which indicates that more of the quantity of the given item having the first item ownership type was needed or that less of the quantity of the given item having the first item ownership type was needed.

19. The computer program product of claim 12, wherein the first mode comprises an aggressive mode, the second mode comprises a normal mode, and the third mode comprises a passive mode.

20. The computer program product of claim 12, wherein:

the percentage division for the given item comprises a first percentage of a quantity of the given item having the first item ownership type and a second percentage of a quantity of the given item having the second item ownership type;

a percentage division range represents a range for each of the first percentage and the second percentage; and a deviation from a percentage division range comprises an error condition which indicates that more of the quantity of the given item having the first item ownership type was needed or that less of the quantity of the given item having the first item ownership type was needed.

* * * * *